United States Patent

Sugawara

[11] Patent Number: 4,571,048
[45] Date of Patent: Feb. 18, 1986

[54] AUTOMATIC FOCUSING SYSTEM OF PHOTOGRAPHIC CAMERA

[75] Inventor: Saburo Sugawara, Tokyo, Japan

[73] Assignee: Asahi Kogaku Kogyo Kabushiki Kaisha, Tokyo, Japan

[21] Appl. No.: 560,551

[22] Filed: Dec. 12, 1983

[30] Foreign Application Priority Data

Dec. 13, 1982 [JP] Japan ............................ 57-216856

[51] Int. Cl.⁴ .............................................. G03B 3/00
[52] U.S. Cl. .................................................... 354/403
[58] Field of Search .............................. 354/402–405; 356/1; 250/201 AF

[56] References Cited

U.S. PATENT DOCUMENTS

| | | | |
|---|---|---|---|
| 4,103,152 | 7/1978 | Stauffer | 354/405 X |
| 4,425,031 | 1/1984 | Tamura et al. | 354/403 |
| 4,470,681 | 9/1984 | Johnson | 354/403 |

*Primary Examiner*—William B. Perkey
*Attorney, Agent, or Firm*—Fleit, Jacobson, Cohn & Price

[57] ABSTRACT

An automatic focusing system of a photographic camera has a distance measuring device (10) for scanning a predetermined photographic range for producing a distance signal representing the distance from a film plane to the photographic subjects. During the scanning, a value of the distance signal corresponding to the nearest photographic subject is detected and held by a memory (18). The photographic lens is adjusted in accordance with the value held by the memory so as to focus an image of the nearest photographic subject. The automatic focusing system enables the user to take well focused photographs of desired composition by simple operations.

8 Claims, 8 Drawing Figures

AUTOMATIC FOCUSING SYSTEM OF PHOTOGRAPHIC CAMERA

FIELD OF THE INVENTION

The present invention relates to an automatic focusing system of a photographic camera.

BACKGROUND OF THE INVENTION

A prior art automatic focusing system has a distance measuring device which is arranged to measure the distance to an object found in a very limited region in the center of the picture composed. A photographic camera incorporating the prior art automatic focusing system is capable of taking photographs of monotonous composition in which focusing has been made to obtain a sharp image of the object in the picture center, but it is not suitable for taking photographs of different taste.

In an improvement suggested to avoid the disadvantage, a distance measuring device measures the distance to the desired subject found in the center of the picture composed and a memory holds the distance information thus obtained. Then, the camera is directed in a desired direction to compose the picture again, and the shutter is released with the photographic lens adjusted in accordance with the distance information held by the memory so that a sharp image of the desired subject can be obtained.

In a photographic camera incorporating the improved arrangement, however, troublesome operations are necessitated for composing the picture before releasing the shutter, so that inexperienced users would not be able to well operate the camera. Particularly in taking snapshots where the desired subject is apt to move, the user must concentrate his attention on composition of the picture, and so it is the more hard for him to well operate the camera.

It is thus an object of the present invention to provide an automatic focusing system of a photographic camera which enables the user to readily compose a picture containing the desired subject and which also enables the user to take well focused photographs.

SUMMARY OF THE INVENTION

In order to achieve the object, the automatic focusing system of a photographic camera according to the present invention essentially comprises: a distance measuring device to produce a distance signal representative of distance from a film plane to subjects; means for driving the distance measuring device to scan a range to be photographed; a memory for detecting and holding a value of the distance signal appearing during the scanning and corresponding to the nearest subject; and means responsive to the value of the distance signal held by the memory for moving a photographic lens of the camera to focus the image of the nearest subject on said film plane.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
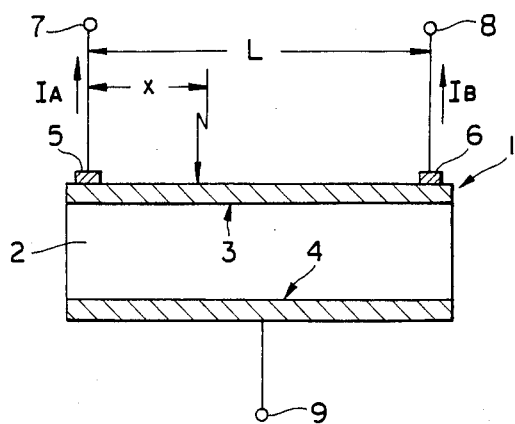
FIG. 1 is a cross sectional view of a position detector included in an embodiment of the automatic focusing system according to the present invention.

To start with, the operating principle of the distance measuring device used in the automatic focusing system will be described. FIG. 1 shows a position detector 1 constituting the distance measuring device. The detector 1 comprises a substrate 2 of a high-resistance semiconductor, e.g. silicon. The substrate 2 has on one side a p-type region 3 which can be exposed to light from within the range or field to be photographed, and on the other side an n-type region 4, the substrate being formed with a p-n junction within it. On opposite ends of the surface of the p-type region 3, there are provided a pair of contacts 5 and 6, which are connected to terminals 7 and 8, respectively. On the other hand, an electrode 9 is connected to the surface of the n-type region 4. The terminals 7 and 8 are negatively biased with respect to the electrode 9 so as to pick up the photoelectricity.

An electric current $I_0$ is generated by light incident on the surface of the p-type region 3 of the substrate 2. The currents $I_A$ and $I_B$ picked up through the output terminals 7 and 8, respectively, are:

$$I_A = I_0 \cdot \frac{R_L - R_x}{R_L} \; ; \; I_B = I_0 \cdot \frac{R_x}{R_L}, \tag{1}$$

here $R_L$ is the electric resistance between the contacts 5 and 6, and $R_x$ is the electric resistance between one contact 5 and an "incident" point where light falls on the p-type region surface, the incident point being spaced by a distance x away from the contact 5. As seen from the equation (1), the electric charge liberated by the incident light diffuses in the p-type region 3, the total amount of the electric charge being proportional to the energy of the incident light, and the amount of the electricity conveyed through each contact 5 and 6 being inversely proportional to the distance from it to the incident point. If the p-type region 3 is homogeneous so that its length and resistance are proportional to each other, the equation (1) may be reduced to the following:

$$I_A = I_0 \cdot \frac{L-x}{L} \; ; \; I_B = I_0 \cdot \frac{x}{L}, \tag{2}$$

here L is the distance between the contacts 5 and 6 and x is the distance from one contact 5 to the incident point.

From the equation (2) the ratio of $I_A$ to $I_B$ is represented as follows:

$$\frac{I_A}{I_B} = \frac{L-x}{x} = \frac{L}{x} - 1. \quad (3)$$

As seen from the equation (3), the ratio $I_A/I_B$ is independent from the energy of the incident light so that the position of the incident point can be known from it.

Figure 2:
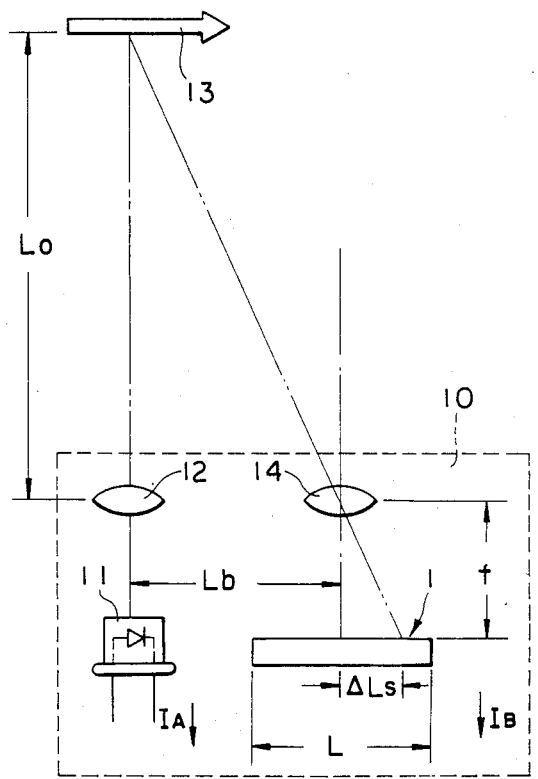
FIG. 2 is a schematic diagram showing the operating principle of the distance measuring device incorporating the device of FIG. 1.

FIG. 2 shows the arrangement of a distance measuring device 10 using the position detector 1 for producing a distance signal representative of the distance to subjects. The distance measuring device 10 includes light emitting means comprising e.g. a light emitting diode 11. The rays of light emitted from the light source 11 are converged by a lens 12 to form a parallel light beam. The light beam is projected to form a light spot on a subject 13. An image of the light spot is formed by a second lens 14 on the surface of the p-type region 3 of the photoelectric converter 2, this surface lying in a plane which is optically equivalent to the film plane (not shown).

In the arrangement of FIG. 2, the position of the incident point, or the point where the image of the light spot on the subject 13 is formed, is represented by the following equation:

$$\Delta Ls = \frac{Lb \cdot f}{L_0} \quad (4)$$

$$I_A \propto \frac{L}{2} - \Delta Ls = \frac{L}{2} - \frac{Lb \cdot f}{L_0} \quad (5)$$

$$I_B \propto \frac{L}{2} + \Delta Ls = \frac{L}{2} + \frac{Lb \cdot f}{L_0} \quad (6)$$

here $L_0$ is the distance from the converging lens 12 to the subject 13, Lb is the distance between the optical axes of the lenses 12 and 14, f is the focal distance of the image forming lens 14, $\Delta Ls$ is the distance, or the displacement of the incident point, from the optical axis of the image forming lens 14 to the incident point as measured along the surface of the photoelectric converter 2.

Here, a distance signal $P_L$ to represent the distance from the photographic subject 13 to the film plane is obtained by the following operation involving the currents $I_A$ and $I_B$:

$$P_L = \frac{I_B - I_A}{I_B + I_A} = \frac{2Lb \cdot f}{L_0 \cdot L} \quad (7)$$

The distance signal $P_L$ can be transformed into a value of voltage by a signal processing circuit as described later.

Figure 3:
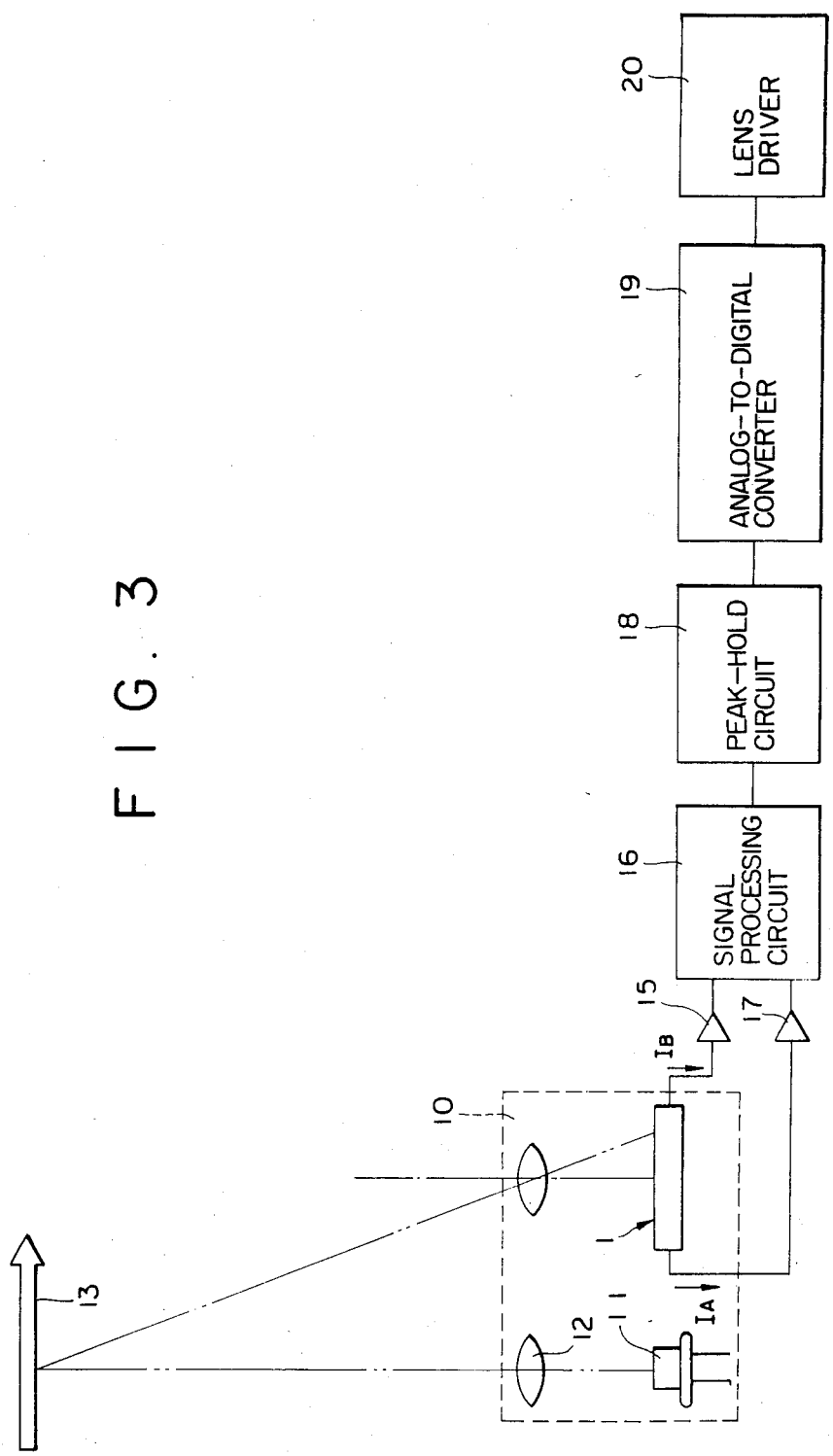
FIG. 3 is a schematic diagram showing an embodiment of the automatic focusing system, which incorporates the device of FIG. 2.
Figure 4:
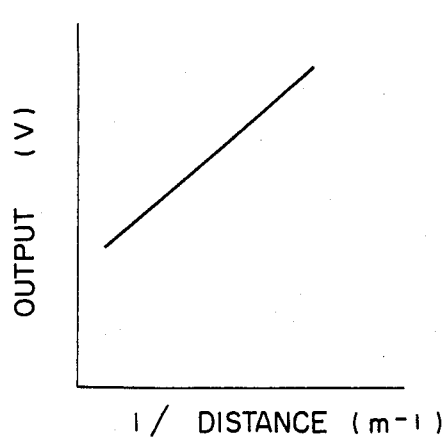
FIG. 4 is a graph showing the variation of the output level from a signal processing circuit 15 of FIG. 3 with respect to the inverse of the distance to the subject.

FIG. 3 shows an embodiment of the automatic focusing system using the distance measuring device 10 as described above. In this embodiment, the output currents $I_A$ and $I_B$ are amplified by amplifiers 15 and 17. The outputs from the amplifiers 15 and 17 are supplied to a signal processing circuit 16. The circuit 16 carries out the above-described operation (7) to transform the $P_L$ into an output voltage. FIG. 4 shows the variation of the output voltage from the circuit 16 to the inverse or reciprocal of the distance to the subject. The output voltage is inversely proportional to the distance.

Figure 6:
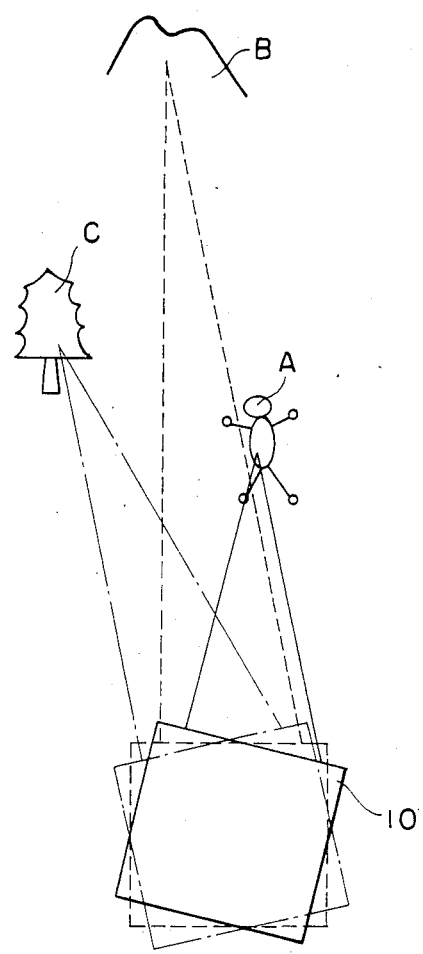
FIG. 6 is a schematic diagram showing the scanning of the distance measuring device.
Figure 5:
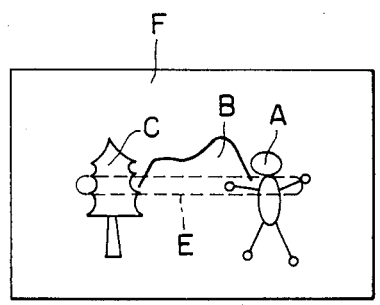
FIG. 5 is a schematic diagram showing a picture composed in which the range scanned by the distance measuring device is shown in broken lines.

The whole of the distance measuring device 10 can be rotated to scan a definite range E within the composed picture F, with the position detector 1 directed for receiving light reflected from subjects A, B, and C, as shown in FIGS. 5 and 6. A drive mechanism (not shown) drives the distance measuring device 10 to rotate through a definite angle in an interlocking manner with the shutter release button (not shown).

The output signal voltage from the signal processing circuit 16 is supplied to a peak-hold circuit 18 which detects and holds a maximum peak value of the distance signal from the circuit 16 representative of the distance to the nearest subject A (FIG. 6). The distance signal held by the circuit 18 is transmitted to an analog-to-digital converter 19 which produces an output signal for stepwise focusing of the photographic lens. The output signal from the converter 19 is supplied to a lens driver 20 which drives the photographic lens into a correct position according to the input distance signal to focus the image of the nearest subject.

The operation of the automatic focusing system of the above arrangement is described. On pushing the shutter release button, the driving mechanism for rotating the distance measuring device 10 is actuated and distance measurement by means of the position detector 1 is performed. After scanning of a definite range by the distance measuring device 10 driven by the driving mechanism, the photographic lens is adjusted in accordance with the distance information which has been picked up during the scanning and which corresponds to the distance to the nearest subject, and thereafter the shutter is released. The sequence of these operations is completed in an instant, so that exposure is actually completed only by pushing the shutter release button. The nearest subject can then be focused on the film plane, and that at a desired region in the picture composed.

Figure 7:
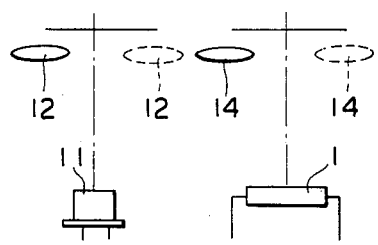
FIGS. 7 and 8 are schematic diagrams showing other arrangements of the driving means for causing scanning of the distance measuring device.
Figure 8:
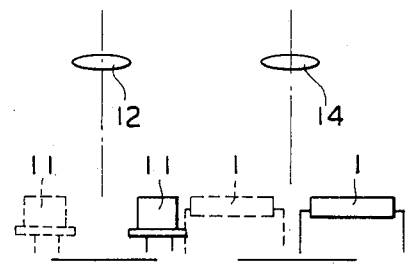

FIGS. 7 and 8 show other arrangements of the means for causing the distance detector 10 to scan.

In the arrangement of FIG. 7, the light emitting diode 11 and the position detector 1 are fixed while the converging lens 12 and the focusing lens 14 are movable in a direction perpendicular to their optical axes, or the direction parallel with the lengthwise direction of the position detector 1. In this arrangement, the lenses 12 and 14 are moved by a common drive mechanism, with the interval between them maintained constant, so that the arrangement is simple.

On the other hand, in the arrangement of FIG. 8, the lenses 12 and 14 are fixed while the light emitting diode 11 and the position detector 1 are movable with a constant interval between them. Also in the arrangement of FIG. 8, a common drive mechanism drives the light emitting diode 11 and the position detector 1 so that the arrangement is simple.

Both of the arrangements of FIGS. 7 and 8 are equivalent in effect to the arrangement shown in FIG. 6 in which the whole of the distance measuring device 10 is rotated.

As described above, according to the present invention, the distance from the film plane to the nearest subject is measured and the extent to which the photographic lens is to be moved is determined in accordance with the measurement, whereby well focused photographs can be taken with a desired nearest subject being in a desired region within the picture composed. Any operations are not necessitated before pushing the shutter release button. Therefore, a photographic camera incorporating the automatic focusing system according to the present invention is suitable for inexperienced users.

What is claimed is:

1. An automatic focusing system of a photographic camera comprising:
   a distance measuring device to produce an analog signal representative of distance from a film plane to subjects, said distance measuring device including a light emitting means for throwing light toward the subjects, and a position detector receiving light reflected from the subjects for producing said distance signal, and in which the place on the position detector where the light falls varies according to the distance to the subject illuminated;
   means for driving said distance measuring device to scan a range to be photographed;
   an analog peak and hold memory for detecting and holding a value of said distance signal appearing during the scanning and corresponding to the nearest subject; and
   means responsive to said value of said distance signal held by said memory for moving a photographic lens of the camera to focus the image of the nearest subject on said film plane.

2. An automatic focusing system of a photographic camera comprising:
   a distance measuring device to produce continuously an analog signal representative of distance from a film plane to subjects, said distance measuring device includes a light emitting means for throwing light toward the subjects, and a position detector receiving light reflected from the subjects for producing said distance signal, and in which the place on the position detector where the light falls varies according to the distance to the subject illuminated;
   means for driving said distance measuring device to scan a certain predetermined zone within a range to be photographed, and to measure the distance between the film place and each of the scanned subjects;
   a memory for detecting and holding a value of said distance signal appearing during the scanning and corresponding to the nearest subject; and
   means responsive to said value of said distance signal held by said memory for moving a photographic lens of the camera to focus the image of the nearest subject on said film plane.

3. An automatic focusing system of a photographic camera as claimed in claim 2, in which said means for driving said distance measuring device is arranged to rotate said distance detector through an angle within a range which can be photographed, thereby to cause said distance measuring device to scan.

4. An automatic focusing system of a photographic camera as claimed in claim 2, in which said light emitting means comprises a light emitting diode, and a first optical system through which the light emitted from said light emitting diode is directed toward the subjects, and in which said position detector comprises a second optical system through which light reflected from the subjects is focused on a photoelectric converter having a definite length, the place on said photoelectric converter where the light falls varying according to the distance to the subjects.

5. An automatic focusing system of a photographic camera as claimed in claim 4, in which said light emitting diode and said photoelectric converter are fixed while said first and second optical systems are moved by a common drive mechanism in a direction parallel with a lengthwise direction of said photoelectric converter.

6. An automatic focusing system of a photographic camera as claimed in claim 4, in which said first and second optical systems are fixed while said light emitting diode and said photoelectric converter are moved by a common drive mechanism in a direction parallel with a lengthwise direction of said photoelectric converter.

7. An automatic focusing system of a photographic camera comprising:
   a distance measuring device to continuously produce an analog distance signal representative of distance from a film plane to subjects;
   means for driving said distance measuring device to scan a certain predetermined zone within a range to be Photographed, and to measure the distance between the film plane and each of the scanned subjects;
   an analog peak and hold memory for detecting and holding a value of said distance signal appearing during the scanning and corresponding to the nearest subject; and
   means responsive to said value of said distance signal held by said memory for moving a photographic lens of the camera to focus the image of the nearest subject on said film plane.

8. An automatic focusing system of a photographic camera as claimed in claim 7 in which said means for driving said distance measuring device is arranged to rotate said distance detector through an angle within a range which can be photographed, thereby to cause said distance measuring device to scan.

* * * * *